E. N. TODD.
PROCESS OF PRODUCING TRANSPARENT COATINGS.
APPLICATION FILED NOV. 14, 1914.
1,143,464.
Patented June 15, 1915.
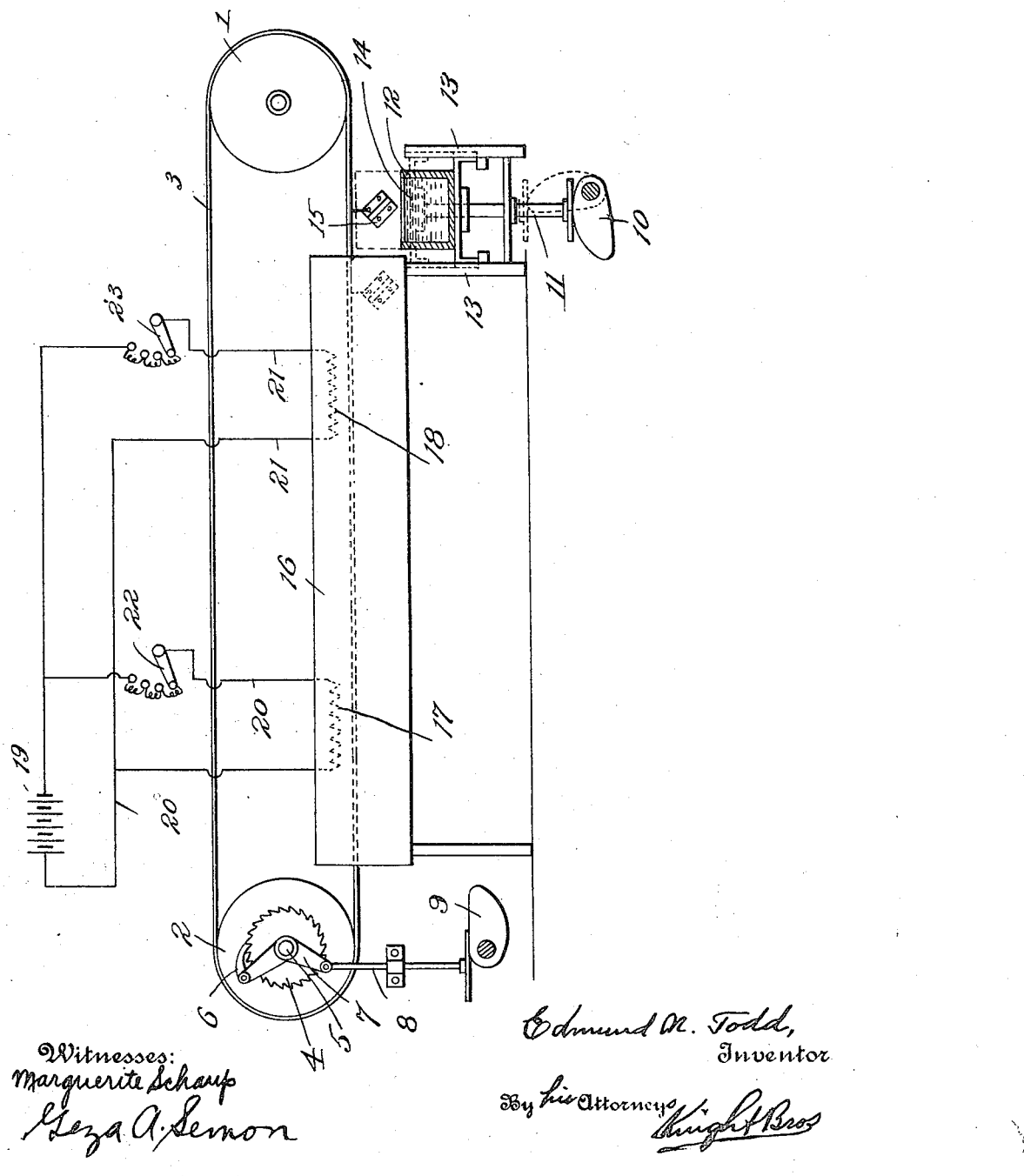

UNITED STATES PATENT OFFICE.

EDMUND N. TODD, OF MILLBURN, NEW JERSEY.

PROCESS OF PRODUCING TRANSPARENT COATINGS.

1,143,464.  Specification of Letters Patent.  Patented June 15, 1915.

Application filed November 14, 1914. Serial No. 872,269.

*To all whom it may concern:*

Be it known that I, EDMUND N. TODD, a citizen of the United States, residing in Millburn, county of Essex, and State of New Jersey, have invented certain new and useful Improvements in Processes of Producing Transparent Coatings, of which the following is a full and clear specification.

My invention relates in general to the production of coatings by lacquers and more especially to the production of transparent coatings of lacquer on metallic and other articles.

The ordinary lacquer produced by dissolving nitro-cellulose in amyl acetate is comparatively expensive, due to the solvent employed. Nitro-cellulose is soluble in many cheaper solvents, but when applied in the ordinary way the lacquer made from cheaper solvents does not retain its transparency, but becomes opaque during the drying.

The object of my invention is to provide a process of producing transparent coatings with cheap lacquers.

According to my invention a cheap solvent, for example wood alcohol, may be employed for the nitro-cellulose and the articles to be lacquered are dipped into this, after which they are immediately introduced into a heated drying compartment where they remain until the lacquer dries and hardens. In this way a clear transparent lacquer is obtained with cheap solvents. The use of the cheap solvents requires for its success a process in which the moisture from the surrounding atmosphere will not be precipitated upon the fresh lacquer and absorbed by the solvent. Amyl acetate is commonly employed by reason of its non-hygroscopic properties. By introducing the freshly coated articles immediately into a heating and drying box, the temperature of the articles is kept above the dew point, so that moisture from the atmosphere is not precipitated upon them. The lacquer is also rapidly dried in the heated environment, so that the articles may be passed continuously into the drying compartment at one end as fast as they are coated and out of the other end in finished condition. After the solvent has been removed in the drying and heating compartment, the lacquer is no longer affected by the exposure to the moisture of the atmosphere and it will continue to retain its transparent quality.

An embodiment of the process is illustrated in the accompanying drawing.

Said drawing shows in diagrammatic elevation an apparatus in which the articles are automatically advanced in step by step manner into a position above a reciprocating lacquer trough and then through a heated drying compartment.

In said drawing, 1 and 2 indicate rollers or pulleys, which carry an endless conveyer 3. Conveyer 3 is driven by means of a ratchet 4 fixed to shaft 5 on pulley 2 and a pawl 6 mounted on a lever 7 journaled on shaft 5. Lever 7 is reciprocated periodically by a rod 8 under the influence of cam 9. It will be observed that cam 9 has a circular portion and during the operation of this portion the conveyer 3 remains stationary. At this time a cam 10 operates the rod 11 which in turn elevates the lacquer trough 12, which is slidably mounted in vertical tracks or ways 13. Trough 12 contains a body of lacquer 14. When the trough is elevated, one of the momentarily stationary articles 15 carried by conveyer 3, is immersed and provided with a coat of fresh lacquer. The further operation of cam 10 permits the trough 12 to descend, whereupon cam 9 again operates ratchet 6 to advance the belt 3. This advance of the belt 3 carries the freshly lacquered article 15 into an open ended drier box 16, which is provided with heating coils 17, 18, supplied with electric current from a suitable source 19, through circuits 20, 21, containing rheostats 22, 23. The step by step advance of the articles 15 continues until they emerge from the dry box 16 when they are removed in finished condition.

The rheostats 22 and 23 are preferably so regulated as to induce a current of air through the box in the same direction as the article progresses. This is accomplished by so regulating the rheostats that the highest temperature is maintained at the end from which the article is removed, this graduation of temperature, together with the removal of the articles through the dry box ventilates the box without a fan, blower or stack and makes it possible to keep the temperature of the coated articles above the dew point. The heated air in dry box 16 not only has its relative humidity reduced due to its increased temperature, and thus rapidly dries the lacquer, but it imparts heat to the lacquer which is subjected to the strong cooling tendency of the rapidly evaporating solvent, so that the temperature of the air surrounding the article is not reduced to the dew point.

I do not claim any invention in the broad idea of drying fresh lacquer in a heated environment, but the invention resides in the discovery that the cheap hygroscopic solvents heretofore unused may be satisfactorily employed for producing transparent lacquer by protecting the freshly lacquered articles against the deposit of dew from the atmosphere, by passing them into a local heated environment immediately following their immersion in the lacquer. The apparatus herein shown is purely illustrative and not intended to limit the process to any particular way of maintaining the articles above the dew point during the drying operation.

I claim:

1. The method of producing transparent coatings from hygroscopic lacquers which comprises applying to the article a hygroscopic lacquer and drying the same while maintaining it above the dew point of the environment.

2. The method of producing transparent coatings from hygroscopic lacquers which comprises applying hygroscopic lacquer to the article and introducing the freshly lacquered article into a local atmosphere maintained at a temperature above its dew point, and discharging the article therefrom after the solvent has been thus removed from the lacquer.

EDMUND N. TODD.

Witnesses:
W. L. D. Bedell,
R. B. Fox.